United States Patent Office 3,522,194
Patented July 28, 1970

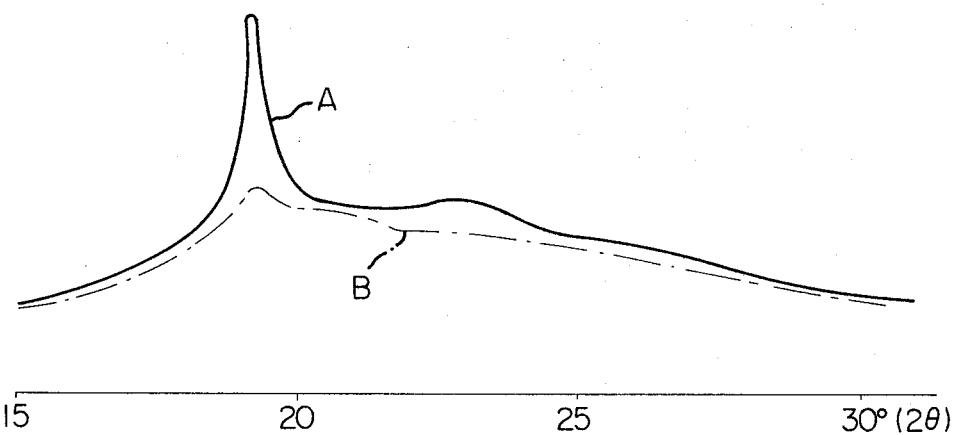

3,522,194
PROCESS FOR POLYMERIZING OLEFIN OXIDE
Nobuhide Hada, Hisataka Komai, and Takaaki Sugimura, Yokohama, Japan, assignors to The Japanese Geon Company, Ltd., Tokyo, Japan, a corporation of Japan
Filed May 21, 1968, Ser. No. 730,864
Claims priority, application Japan, May 22, 1967, 42/32,063
Int. Cl. C08g 23/14
U.S. Cl. 260—2                   1 Claim

ABSTRACT OF THE DISCLOSURE

A process for polymerizing or copolymerizing three-membered cyclic ethers using as catalyst a composition prepared from an organoaluminum compound selected from the group consisting of aluminum alkyl, aluminum alkyl halide and aluminum alkyl hydride and an organic monocarboxylic acid ester (and preferably also water).

---

This invention relates to a new process for polymerizing or copolymerizing three-membered cyclic ethers.

The use of a catalyst prepared from an organoaluminum compound and water in polymerizing or copolymerizing the three-membered cyclic ethers has been known hitherto. However, only polyethers of relatively low molecular weight can be prepared by the use of a catalyst of this sort.

The object of the present invention resides in improving this conventional process and to provide a process whereby polyethers of high molecular weight can be obtained.

The foregoing object of the invention can be achieved by the use of (a) a catalyst prepared from an organoaluminum compound and an organic monocarboxylic acid ester, or (b) a catalyst prepared from an organoaluminum compound, an organic monocarboxylic acid ester and water in polymerizing or copolymerizing the three-membered cyclic ethers.

The organoaluminum compound, one of the components of the catalyst in the present invention, is meant to be a compound selected from the group consisting of aluminum alkyl, aluminum alkyl halide and aluminum alkyl hydride in which the alkyl group is from 1 to 12 carbon atoms. In other words, these compounds are represented by the general formula $AlX_nR_{3-n}$, wherein R is an alkyl group of 1–12 carbon atoms, X is halogen or hydrogen and $n$ is a number from 0–2. Specific examples include triethylaluminum, triisobutylaluminum, tridodecylaluminum, ethylisobutylaluminum chloride, diethylaluminum fluoride, diethylaluminum chloride, diethylaluminum iodide, diisobutylaluminum hydride, diethylaluminum bromide, isobutylaluminum dichloride and ethylaluminum sesquichloride. Further, the various alkylaluminum halide mixtures obtained by the reaction of metallic aluminum and alkyl halides or the reaction of alkylaluminum and aluminum halides are also, of course, included in the organoaluminum compounds of the present invention. In addition, usable are also the compounds obtained by modifying the aforesaid organoaluminum compounds with such as methanol, ethanol, cresol, ethylene glycol, propylene glycol, catechol, etc., or the compounds obtained by coordinating the aforesaid organoaluminum compound with a Lewis base such as ethyl ether, dioxane, tetrahydrofuran, thiophene, pyridine, tertiary amines, etc., or the complexes obtained by reacting the aforesaid organoaluminum compounds with a complexing agent of the formula $MY_m$, wherein M is a metal of either Groups I or II of the Periodic Table, Y is either hydrogen, fluorine, bromine or iodine, and $m$ is the valency of the metal M.

The organic monocarboxylic acid ester, the other component of the catalyst of this invention (hereinafter referred to for sake of brevity as organic ester) is either a chain or cyclic monoester having a

bond in its molecule. More specifically, it is an organic ester represented by either the formula

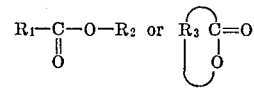

wherein $R_1$ and $R_2$ are each either the same or different saturated aliphatic hydrocarbon residue, halo substituted saturated aliphatic hydrocarbon residue, unsaturated aliphatic hydrocarbon residue, alicyclic hydrocarbon residue or aromatic hydrocarbon residue and $R_3$ is an alkylene residue of 2–15 carbon atoms. As examples of these organic esters, included are ethyl acetate, t-butyl propionate, 2 - ethylbutyl acetate, methyl palmitate, vinyl acetate, methyl acrylate, methyl methacrylate, 2 - acetoxy - 1-propane, methyl - 3 - pentanoate, allyl acrylate, methyl-2-octoate, methyl benzoate, phenyl acetate, phenyl acrylate, ethyl cinnamate, cyclohexyl acetate, ethyl - 1 - cyclohexene carboxylate, methyl chloroacetate, methyl dichloroacetate, methyl trichloroacetate, ethyl trifluoroacetate, benzyl chloroformate, bromomethyl benzoate, etc. In addition, the lactones, i.e. intramolecular esters, such as beta-propiolactone, gamma-butyrolactone, delta-valerolactone, etc., are also included in the foregoing organic esters.

In preparing the catalyst, the proportion in which the organoaluminum compound, organic ester and water are used can be correlatively varied broadly. That is to say, the organic ester can be used in a range of 0.02–20 moles, and preferably 0.05–5 moles, per mole of the organoaluminum compound. On the other hand, the water is used in a range of 0–10 moles, and preferably 0.3–2 moles, per mole of the organoaluminum compound. When the two components of the organoaluminum compound and the organic ester or the three components of the organoaluminum compound, the organic ester and water are mixed respectively in accordance with the foregoing molar ratios, a new catalyst system whose activity is very great is formed, though its structure is not as yet clear.

The mixing of the organoaluminum compound and the organic ester or the organoaluminum compound, the organic ester and water can be carried out by the addition of the components in any sequence. A particularly desirable sequence of addition is one in which the organoaluminum compound, organic ester and water are added in the sequence given. Further, the catalyst may be prepared in the presence of the three-membered cyclic ether, or the catalyst whose preparation has been completed may be added to the three-membered ether. Again, the temperature used in preparing the catalyst, as in the case with the conventional methods, may be a broad range extending from −78° to 200° C. The amount used of this catalyst, as in the conventional practice, can be varied over a broad range, it being possible to suitably use, calculated as the organoaluminum compound, ordinarily amounts ranging from 0.1 mol percent to 10 mol percent, or on occasions in a greater amount, based on the monomer.

The three-membered cyclic ethers which can be polymerized by the invention process include alkylene oxides such as ethylene oxide, propylene oxide, 1-butene oxide, 2-butene oxide, isobutylene oxide and 1-hexene oxide; substituted alkylene oxides such as cyclohexene oxide, styrene oxide, and glycidyl ethers of phenol and bisphenol; and halogen-containing three-membered ethers such as epichlorohydrin, epibromohydrin, epifluorohydrin, trifluoromethylethylene oxide, perfluoropropylene oxide and perfluoroethylene oxide. Also included as the three-membered ethers in the present invention are the three-membered ethers containing an unsaturated bond, such as vinylcyclohexene monoxide, allylglycidyl ether, glycidyl methacrylate, butadiene monoxide and 2-methyl-5,6-epoxyhexene-1. The unsaturated bond-containing three-membered ethers can be copolymerized with the foregoing saturated three-membered ethers to provide the polymers with an olefinically unsaturated bond. Again, the three-membered ether need not necessarily be of a single class but may be a mixture of two or more thereof.

While a solvent or a diluent is not necessarily used in the invention process, it is also possible to use any so long as it does not have any detrimental effects on the catalyst and polymerization systems of the present invention. A solvent is preferably used for obtaining polymers of high degree of polymerization. Conveniently used are the aliphatic, aromatic and alicyclic hydrocarbons for example, n-hexane, benzene, and cyclohexane, the halogenated aliphatic hydrocarbons, for example, methylene dichloride, chlorobenzene and cyclohexyl chloride, and the cyclic or chain ethers, for example, dioxaine and ethyl ether. However, the organic esters, one of components of the catalyst, such, for example, as ethyl acetate, cannot be used as the diluent.

While the polymerization process of the present invention can be conducted under a wide range of temperatures and pressures, as in the case of the conventional methods, usually a polymerization temperature ranging between −50° and +200° C. is employed, while the polymerization pressure employed is one ranging from 1 atmosphere to 200 atmospheres.

The catalyst of the present invention is of very great advantage in practice, as is apparent from the accompanying figure, since the molecular weight, crystallinity, etc., of the resulting polymer can be controlled by varying the class of the organoaluminum compound and organic ester and the proportion in which they are used. That is say, the polymers or copolymers of the three-membered cyclic ethers exhibit differing physical properties depending upon their crystallinity and, consequently, when they are to be used, for example, as rubber, their resistance to oil and tensile strength can be suitably varied by varying their crystallinity suitably.

The figure of the drawing is an X-ray diffraction spectrogram for indicating the difference which occurs in the crystallinity of the resulting polymer because of the composition of the catalyst. The figure of the drawing will be more fully described in the hereinafter given examples.

Further, in the case of the catalyst of the present invention comprising an organoaluminum compound, an organic ester and water, the reaction during its preparation is milder than in the case of the hitherto known catalyst comprising an organoaluminum compound and water, and since a uniform compostiion can be readily obtained, it has the advantage, when used in the polymerization or copolymerization reaction of the three-membered cyclic ethers, that the reaction proceeds with good reproducibility.

The following examples are given for further illustration of the present invention more specifically. Unless otherwise noted, the percentages and parts in the examples are on a weight basis.

EXAMPLE 1

A thoroughly dried pressure-resistant glass polymerization vessel of 100 ml. capacity is filled with dry nitrogen, after which 50 ml. of benzene thoroughly dried with calcium hydride are introduced, followed by the addition of 0.397 gram (0.0020 mol) of triisobutyl-aluminum and 0.540 gram (0.0020 mol) of methyl palmitate and then allowing the mixture to stand for 30 minutes at room temperature. After further addition of 0.0288 gram (0.0016 mol) of water and 11.7 grams (10 ml.) of epichlorohydrin in the order given, the reaction mixture is agitated for 5 hours at 60° C. The reaction is then stopped by adding methanol to the reaction mixture, followed by washing with 1 normal aqueous hydrochloric acid solution to remove the polymerization catalyst. Next, the reaction product is neutralized with ½ normal aqueous caustic soda solution, followed by water-washing and then freeze-drying to obtain at a yield of 54.4% a solid polymer whose elasticity is extremely great. A 0.1% cyclohexanone solution of this polymer was made by heating 0.0473 gram thereof along with 50 ml. of 0.5% cyclohexanone solution of 2,2-methylene-bis(4-methyl-6-tertiary butyl phenol) for 2 hours at 115° C. The reduced specific viscosity $\eta_{sp./C}$ of this solution was measured at 50° C. was 1.81 (unless otherwise noted, the reducing specific viscosity $\eta_{sp./C_1}$ hereinafter indicated have been measured under these conditions). When 0.5 gram of this polymer was extracted for 24 hours with acetone using the Soxhlet extractor, the acetone-insoluble portion was 2.3%.

EXAMPLES 2-5

In Example 1 the amount used of the catalyst was varied without changing its composition. As is apparent from the following table, epichlorohydrin polymers of high molecular weight were obtained at yields about proportional to the amount used of the catalyst.

| | Mols of triisobutyl-aluminum (grams) | Yield, percent | Reduced specific viscosity, $\eta_{sp./C}$ |
|---|---|---|---|
| Example: | | | |
| 2 | 0.0010 (0.198) | 29.6 | 1.51 |
| 3 | 0.0015 (0.297) | 42.5 | 1.51 |
| 4 | 0.0030 (0.595) | 71.9 | 1.90 |
| 5 | 0.0050 (0.990) | 100.0 | 1.53 |

EXAMPLES 6-10

In Example 1 ethyl acetate was used instead of methyl palmitate, and the amount used of the catalyst was varied but without changing the molar composition of the catalyst components. As can be seen from the following table, epichlorohydrin polymers of high molecular weight were obtained at yields about proportional to the amount of catalyst used.

| | Mols of triisobutyl-aluminum (grams) | Yield, percent | Reduced specific viscosity, $\eta_{sp./C}$ |
|---|---|---|---|
| Example: | | | |
| 6 | 0.0010 (0.198) | 18.6 | 1.34 |
| 7 | 0.0015 (0.297) | 28.9 | 1.63 |
| 8 | 0.0020 (0.397) | 35.6 | 1.65 |
| 9 | 0.0030 (0.595) | 45.1 | 1.42 |
| 10 | 0.0050 (0.990) | 68.9 | 1.45 |

COMPARISONS 1-5

The results in the case the organic ester was not used in the processes given in Examples 1–10 are set forth in the following table.

| Comparison | Mols of triisobutyl-aluminum (grams) | | Yield, percent | Reduced specific viscosity, $\eta_{(sp./C.)}$ |
|---|---|---|---|---|
| 1 | 0.0010 | (0.198) | 21.2 | 0.60 |
| 2 | 0.0015 | (0.297) | 31.4 | 0.62 |
| 3 | 0.0020 | (0.397) | 42.8 | 0.63 |
| 4 | 0.0030 | (0.595) | 55.5 | 0.62 |
| 5 | 0.0050 | (0.990) | 78.2 | 0.61 |

When the results of the foregoing Examples 1–10 which uses an organic ester as one of the components of the catalyst are compared with the results presented in the foregoing table, it is seen that as far as the yield is concerned whereas an increase was noted in the case of Examples 1–5 where methyl palmitate was used, a decrease was noted in the case of Examples 6–10 where ethyl acetate was used. However, the feature of the catalyst of Examples 1–10 which contain the organic ester resides not in the fact that an increase in yield is had but rather that polymers of high molecular weight were obtained. That is to say, in the case of the catalyst not containing the organic ester (Comparisons 1–5), only polymers of low molecular weight unsuitable for use as rubber, as indicated by their reduced specific viscosity of about 0.6 (corresponding to a molecular weight of about 120,000), can be obtained, whereas, for example, in the case of Example 4 a polymer of high molecular weight, as indicated by a reduced specific viscosity of 1.90 (corresponding to a molecular weight of about 720,000) can be obtained.

EXAMPLES 11–15

Even when the sequence of addition of the catalyst components of Example 1 was carried as indicated in the following table, polymers of high molecular weight as set forth therein were obtained. To facilitate comparison, the results of Example 1 are also presented in the table.

| Example | Sequence of addition | Yield (percent) | Reduced specific viscosity $(\eta_{sp./C.})$ |
|---|---|---|---|
| 11 | B → A → P → W → E | 54.4 | 1.81 |
| 12 | B → A → W → P → E | 39.9 | 1.02 |
| 13 | B → E → A → P → W | 43.8 | 2.48 |
| 14 | B → E → A → W → P | 37.3 | 1.22 |
| 15 | B → E → P → W → A | 44.3 | 1.94 |

NOTE: B=benzene; A=triisobutylaluminum; P=methyl palmitate; W=water; E=epichlorohydrin.

EXAMPLES 16–24

In Example 6 the amount used of triisobutylaluminum was left unchanged at 0.0010 mol (0.198 gram) but the amounts used of water and ethyl acetate were varied, with the result that in all cases solid polymers were obtained as shown in the following table. To facilitate comparison, the results of Comparison 1 and Example 6 are also presented.

| | Molar ratio | | Yield (percent) | Reduced specific viscosity $(\eta_{sp./C.})$ |
|---|---|---|---|---|
| | Ethyl acetate/ triisobutyl-aluminum | Water/ triisobutyl-aluminum | | |
| Comparison 1 | 0.0 | 0.8 | 21.2 | 0.60 |
| Example: | | | | |
| 16 | 0.5 | 0.8 | 21.7 | 1.24 |
| 6 | 1.0 | 0.8 | 18.6 | 1.34 |
| 17 | 2.0 | 0.8 | 17.8 | 1.26 |
| 18 | 3.0 | 0.8 | 20.7 | 1.26 |
| 19 | 5.0 | 0.8 | 18.2 | 1.40 |
| 20 | 1.0 | 0.0 | 9.0 | 0.31 |
| 21 | 1.0 | 0.4 | 12.5 | 0.45 |
| 22 | 1.0 | 0.6 | 12.5 | 0.81 |
| 23 | 1.0 | 1.0 | 13.2 | 0.93 |
| 24 | 1.0 | 1.2 | 5.1 | 0.60 |

The crystallinity of the epichlorohydrin polymers obtained in Examples 6 and 16 was examined by means of X-ray diffraction. In the figure of the drawing curves A and B are respectively the X-ray diffraction patterns of the polymers of Examples 6 and 16. The conditions of measurement were as follows:

Target _____ Copper
Filter _____ Nickel
Voltage _____ 40 kv.
Tube current _____ 5 ma.
Scanning speed _____ 1°/min.
Chart speed _____ 1 cm./min.
Slit _____ 1°1° 0.2 mm.

In the case of the polymer of Example 6 obtained by means of a catalyst in which the amount used of the organic ester was great, the peak appeared at the diffraction angle (2θ) 19.5° to indicate the presence of a crystalline portion. In view of this, it can be seen that the crystallinity of the polymer can be adjusted by the amount used of the organic ester.

EXAMPLES 25–36

Even when the triisobutylaluminum compound is substituted by other organoaluminum compounds in Example 1, solid polymers can be obtained as shown in the following table. The polymerization time in the case of Examples 27 and 28 were 22 hours, however.

| | Organoaluminum compound | Yield (percent) | Reduced specific viscosity $(\eta_{sp./C.})$ |
|---|---|---|---|
| Example: | | | |
| 25 | Triethylaluminum | 61.5 | 1.88 |
| 26 | Tri-n-hexylaluminum | 75.5 | 3.35 |
| 27 | Diethylaluminum chloride | 21.8 | 1.34 |
| 28 | Ethylaluminum chloride | 21.4 | 1.42 |
| 29 | Triisobutylaluminum and tetrahydrofuran (mol ratio 1/1) | 69.1 | 3.68 |
| 30 | Triisobutylaluminum and dioxane (mol ratio 1/1) | 54.3 | 2.14 |
| 31 | Triisobutylaluminum and theophene (mol ratio 1/1) | 44.8 | 1.81 |
| 32 | Triisobutylaluminum and pyridine (mol ratio 10/1) | 18.4 | 3.52 |
| 33 | Triisobutylaluminum and ethyl alcohol (mol ratio 2/1) | 39.6 | 0.88 |
| 34 | Triisobutylaluminum and ethyl alcohol (mol ratio 3/1) | 32.2 | 0.94 |
| 35 | Triisobutylaluminum and potassium chloride (mol ratio 1/1) | 48.5 | 1.90 |
| 36 | Triisobutylaluminum and sodium fluoride (mol ratio 1/1) | 46.8 | 1.25 |

EXAMPLES 37–46

Solid polymers were obtained as shown in the following table even when the ethyl acetate was substituted by the other organic esters in Example 6. To facilitate comparison, the results of Examples 2 and 6 are also presented.

| | Organic ester | Yield percent | Reduced specific viscosity ($\eta_{sp.}/c$) |
|---|---|---|---|
| Example: | | | |
| 6 | Ethyl acetate | 18.6 | 1.34 |
| 2 | Methyl palmitate | 29.6 | 1.51 |
| 37 | n-Butyl acetate | 17.8 | 0.99 |
| 38 | Phenyl acetate | 13.2 | 0.69 |
| 39 | Ethyl benzoate | 22.4 | 0.86 |
| 40 | Cyclohexyl acetate | 18.2 | 0.81 |
| 41 | Vinyl acetate | 26.0 | 1.73 |
| 42 | Methyl methacrylate | 24.6 | 1.13 |
| 43 | Ethyl dichloroacetate | 22.0 | 1.25 |
| 44 | Benzyl chloroformate | 11.3 | 0.70 |
| 45 | Beta-propiolactone | 14.6 | 1.43 |
| 46 | Gamma-butyrolactone | 17.2 | 1.61 |

EXAMPLES 47–53

Polymers were obtained as shown in the following table, even when, in Example 1, the methyl palmitate was changed to other organic esters and, in addition, water was not used.

| | Organic ester | Yield percent | Reduced specific viscosity ($\eta_{sp.}/c$) |
|---|---|---|---|
| Example | | | |
| 47 | Methyl methacrylate | 17.7 | 0.16 |
| 48 | Methyl acrylate | 14.7 | 0.11 |
| 49 | Ethyl benzoate | 18.5 | 0.16 |
| 50 | Ethyl valerate | 10.7 | 0.12 |
| 51 | Ethyl trifluoroacetate | 9.2 | 0.11 |
| 52 | Ethyl dichloroacetate | 7.8 | 0.17 |
| 53 | Phenyl acetate | 16.8 | 0.16 |

EXAMPLES 54–56

Solid polymers were obtained, as indicated in the following table, even when the polymerization temperature was varied in Example 6. To facilitate comparison, the results of Example 6 and also shown.

| | Polymerization temperature (° C.) | Yield percent | Reduced specific viscosity ($\eta_{sp.}/c$) |
|---|---|---|---|
| Example: | | | |
| 54 | 20 | 4.3 | — |
| 55 | 40 | 14.1 | 1.69 |
| 6 | 60 | 18.6 | 1.34 |
| 56 | 80 | 25.0 | 1.01 |

[1] Not measured.

EXAMPLES 57–60

In Example 1, after addition of the methyl palmitate, the reaction mixture was aged at 60° C. for various periods of time. As a result, solid polymers, as shown in the following table, were obtained. To facilitate comparison, the results of Example 1 are also presented.

| | Ageing temperature (° C.) | Ageing time (hour) | Yield percent | Reduced specific viscosity ($\eta_{sp.}/c$) |
|---|---|---|---|---|
| Example: | | | | |
| 1 | [1] | 0.5 | 54.4 | 1.81 |
| 57 | 60 | 0.5 | 46.7 | 1.13 |
| 58 | 60 | 1.0 | 48.8 | 1.13 |
| 59 | 60 | 3.0 | 39.9 | 1.13 |
| 60 | 60 | 5.0 | 39.4 | 1.44 |

[1] Room temperature.

EXAMPLES 61–66

When the amount of benzene was varied in Example 1, solid high molecular weight polymers were obtained as indicated in the following table at yield which were practically uniform. In Examples 64, 65 and 66 a pressure-resistant glass polymerization vessel having a capacity of 200 ml. was used however. To facilitate comparison, the results of Example 1 are also given.

| | Amount used of benzene (ml.) | Yield (percent) | Reduced specific viscosity ($\eta_p./c$) |
|---|---|---|---|
| Example: | | | |
| 61 | 10 | 56.4 | 0.38 |
| 62 | 30 | 50.4 | 1.00 |
| 1 | 50 | 54.4 | 1.81 |
| 63 | 70 | 50.8 | 1.88 |
| 64 | 90 | 53.9 | 2.11 |
| 65 | 120 | 52.1 | 2.37 |
| 66 | 160 | 51.1 | 2.32 |

EXAMPLES 67–74

Other organic solvents were used instead of benzene in either Example 1 or 8 and solid polymers such as shown in the following table were obtained.

| | Organic solvent | Organic ester | Yield (percent) | Reduced specific viscosity ($\eta_p./c$) |
|---|---|---|---|---|
| Example: | | | | |
| 67 | Toluene | Methyl palmitate | 51.1 | 1.35 |
| 68 | Dioxane | do | 13.9 | 0.72 |
| 69 [1] | Tetrahydrofuran | do | 18.5 | 0.53 |
| 70 | Furan | do | 58.7 | 3.7 |
| 71 | Ethyl ether | Ethyl acetate | 27.6 | 1.76 |
| 72 | Methylene dichloride | do | 30.2 | 1.93 |
| 73 | n'-Hexane | do | 27.8 | 0.34 |
| 74 | Chlorobenzene | do | 25.9 | 1.58 |

[1] Since the product of this example was found by means of an elemental analysis to be a copolymer of 84.2 mol percent of tetrahydrofuran and 15.8 mol percent of epichlorohydrin, the weight ratio of the polymer to the total weight of epichlorohydrin and tetrahydrofuran was adopted as the yield.

In Examples 67–74, after the reaction was terminated, the reaction mixture was washed in 1 normal aqueous hydrochloric acid solution to remove the polymerization catalyst, then neutralized with ½ normal aqueous caustic soda solution, followed by water-washing, after which the organic solvent layer was vacuum dried to remove the solvent, whereupon the solid polymer was obtained.

EXAMPLES 75–77

Other classes of three-membered cyclic ethers were used instead of epichlorohydrin in Example 6 and the results shown in the following table were obtained. The inherent viscosity as here used is a value measured in benzene at 30° C.

| | Epoxy monomer | Yield (percent) | Inherent viscosity |
|---|---|---|---|
| Example: | | | |
| 75 | Propylene oxide | 14.4 | 1.02 |
| 76 | Ethylene oxide | 22.4 | 2.14 |
| 77 | 1,2-butene oxide | 38.6 | 1.13 |

EXAMPLE 78

When, in Example 1, 0.282 gram (0.0010 mol) of tri-n-hexyl-aluminum, 0.0088 gram (0.0010 mol) of ethylacetate and 0.0144 gram (0.0008 mol) of water were used as catalyst, and a mixture of 11.8 grams (0.128 mol) of epichlorohydrin and 1.0 gram (0.017 mol) of propylene oxide was used as the three-membered cyclic ether, a copolymer having a reduced specific viscosity of 1.50 was obtained at a yield of 41%.

As a result of chlorine analysis, the content of epichlorohydrin in the copolymer was 87.1 mol percent.

EXAMPLES 79–80

When, in Example 78, a mixture of 11.8 grams (0.128 mol) of epichlorohydrin and one gram of an unsaturated double bond-containing three-membered cyclic ether indicated in the following table was used as the three-membered cyclic ether, solid polymers were obtained in both instances.

The presence of an olefinically unsaturated double bond was observed in the infrared absorption spectra of these polymers.

| Ex. | Unsaturated double bond-containing monomer | Yield (percent) | Reduced specific viscosity ($\eta_{sp}/c$) | Epichlorohydrin content of copolymer (mol percent) |
|---|---|---|---|---|
| 79 | Allylglycidyl ether | 25.4 | 1.19 | 77.8 |
| 80 | Vinylcyclohexane monoxide | 26.8 | 2.69 | 95.0 |

EXAMPLE 81

A thoroughly dried pressure-resistant glass polymerization vessel of 3-liter capacity is filled with dry nitrogen, after which 1.5 liters of benzene thoroughly dried with calcium hydride is placed in the vessel, followed by the pouring in of 230 grams (2.49 mols) of epichlorohydrin and 52 grams (1.18 mols) of ethylene oxide. Separately, a thoroughly dried 100-ml. glass vessel for preparation of catalyst is filled with dry nitrogen, followed by the addition thereto of 50 ml. of benzene thoroughly dried with calcium hydride, 8.47 grams (0.0300 mol) of tri-n-hexylaluminum, 2.16 grams (0.0300 mol) of tetrahydrofuran, 2.64 grams (0.0300 mol) of ethyl acetate and 0.432 gram (0.0240 mol) of water, in the sequence given, to thereby prepare the catalyst. The catalyst prepared in this manner is divided into four equal portions and added to the previously described polymerization vessel at 30-minute intervals, the stirring of the reaction mixture being carried out for 3 hours at 60° C. Next, the reaction was stopped by adding methanol containing a small amount of 2,6-di-t-butyl cresol. After removal of the solvent, unreacted monomers and methanol by blowing steam, the reaction product was dried with hot air.

The yield of the copolymer was 23.2% and its reduced specific viscosity was 2.67. When this copolymer was extracted for 24 hours with water, using the Soxhlet extractor, the water-soluble portion was 0.8%. As a result of chlorine analysis, the composition of this copolymer was found to be 69.5 mol percent of epichlorohydrin and 30.5 mol percent of ethylene oxide.

EXAMPLE 82

A thoroughly dried pressure-resistant stainless steel polymerization vessel of 50-liter capacity is filled with dry nitrogen, following with 29.6 kg. of benzene thoroughly dried with a molecular sieve and 7.9 kg. (85.5 mols) of epichlorohydrin are poured in, followed by the addition of 11.5 grams (0.640 mol) of water.

Separately, a thoroughly dried 1-liter glass vessel for preparation of the catalyst is filled with dry nitrogen, to which vessel are then added 500 ml. of benzene thoroughly dried with a molecular sieve, 159 grams (0.800 mol) of triisobutylaluminum and 70.4 grams (0.800 mol) of ethyl acetate to prepare the catalyst.

This catalyst is poured into the foregoing pressure-resistant stainless steel polymerization vessel, followed by stirring for 5 hours for 60° C. The polymerization reaction was then stopped by adding acetone containing a small amount of 2,6-di-t-butylcresol to the reaction mixture. After removal of the solvent, unreacted monomers and acetone by blowing steam, the reaction product was dried with hot air.

A rubbery polymer having a reduced specific viscosity of 1.46 was obtained at a yield of 29%. When 0.5 gram of this polymer was extracted for 24 hours with 150 ml. acetone, using the Soxhlet extractor, the acetone-insoluble portion was 10.2%.

One hundred parts by weight of the so obtained rubbery polymer were compounded with:

| | Parts by weight |
|---|---|
| FEF-carbon black | 50 |
| Zinc stearate | 1 |
| Lead oxide | 5 |
| Nickel dibutyldithiocarbamate | 2 |
| 2-mercaptoimidazolin | 1.5 |

The resulting mixture was then milled for 10 minutes on rolls heated at 80° C., followed by hot pressing for 30 minutes at 160° C. The physical properties of the resulting vulcanized rubber was as follows:

| | |
|---|---|
| Tensile strength, kg./cm.² | 130–160 |
| 300% modulus, kg./cm.² | 70–140 |
| Elongation, percent | 660–400 |
| Hardness (JIS) | 65–57 |

What is claimed is:

1. In the process for polymerizing at least one olefin oxide having a three-membered cyclic ether in the presence of a catalyst at a temperature ranging from −50° C. to 200° C. and a pressure ranging from 1 to 200 atmospheres, the improvement which is characterized in that the catalyst is a composition constituted by mixing an organoaluminum compound selected from the group consisting of aluminum alkyl, aluminum alkyl halide, and aluminum alkyl hydride in which the alkyl group has from 1 to 12 carbon atoms, with an organic monocarboxylic acid ester represented by the formula

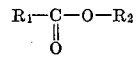

$$R_1-\underset{\underset{O}{\|}}{C}-O-R_2$$

wherein $R_1$ and $R_2$, which may be the same or different, are selected from the group consisting of a saturated aliphatic hydrocarbon residue, an unsaturated aliphatic hydrocarbon residue, an alicyclic hydrocarbon residue and an aromatic hydrocarbon residue, and water, said catalyst being employed in an amount from about 0.1 to about 10 mol percent based on the monomer and calculated as organo-aluminum compound.

References Cited

UNITED STATES PATENTS 3,135,705  6/1964  Vandenberg.

OTHER REFERENCES

Polymerization of Aldehydes and Oxides, Furukawa, 1963 (pp. 435–437).

Pure and Applied Chemistry, vol. 4, Nos. 2–4, Furukawa, 1962 (pp. 387–388).

WILLIAM H. SHORT, Primary Examiner

T. PERTILLA, Assistant Examiner

U.S. Cl. X.R.
260—47, 88.3